United States Patent [19]

Lorence et al.

[11] Patent Number: 4,907,775
[45] Date of Patent: Mar. 13, 1990

[54] CONTAINER HOLDER

[75] Inventors: Brian S. Lorence, Warren; Richard A. Phelps, Ferndale, both of Mich.

[73] Assignee: Chivas Products Limited, Sterling Heights, Mich.

[21] Appl. No.: 312,086

[22] Filed: Feb. 17, 1989

[51] Int. Cl.⁴ .................................................. A47C 7/62
[52] U.S. Cl. .................................. 248/311.2; 297/194
[58] Field of Search ............... 248/311.2, 286, 293, 248/309.1, 310, 314, 315, 359 C; 211/80, 81; 297/194, 188; 108/26, 44, 45; 296/37.12, 37.14, 37.15; 312/313, 323; 224/275, 281, 282, 42.45 R

[56] References Cited

U.S. PATENT DOCUMENTS

| | | | |
|---|---|---|---|
| 2,574,250 | 11/1951 | Dalton | 108/45 |
| 3,637,184 | 1/1972 | O'Brien | 248/311.2 |
| 4,040,659 | 8/1977 | Arnold | 297/194 |
| 4,417,764 | 11/1983 | Marcus | 108/44 |
| 4,733,908 | 3/1988 | Dykstra . | |
| 4,738,423 | 4/1988 | DeFilippo . | |
| 4,783,037 | 11/1988 | Flowerday | 248/311.2 |

Primary Examiner—Ramon O. Ramirez
Assistant Examiner—Robert A. Olson
Attorney, Agent, or Firm—Townsend & Townsend

[57] ABSTRACT

A container holder (2) for use with a support (4) including a frame (8) slidable within a housing (6) movable between a vertical, storage position, and a horizontal, operational position. The housing (6) is a box-like configuration having a slot (18) formed at one end. The frame (8) includes an integral member (26) having an opening (28) to accommodate beverage containers such as cans and cups. When in the storage position, the frame (8) is retained within the housing (6) in a vertical position. As the frame (8) moves to its operational position, it is guided through the slot (18) and pivots to a horizontal, operational position, generally perpendicular to its vertical, storage position. This operation enables the container holder (2) to be conveniently stored in a narrow space.

18 Claims, 1 Drawing Sheet

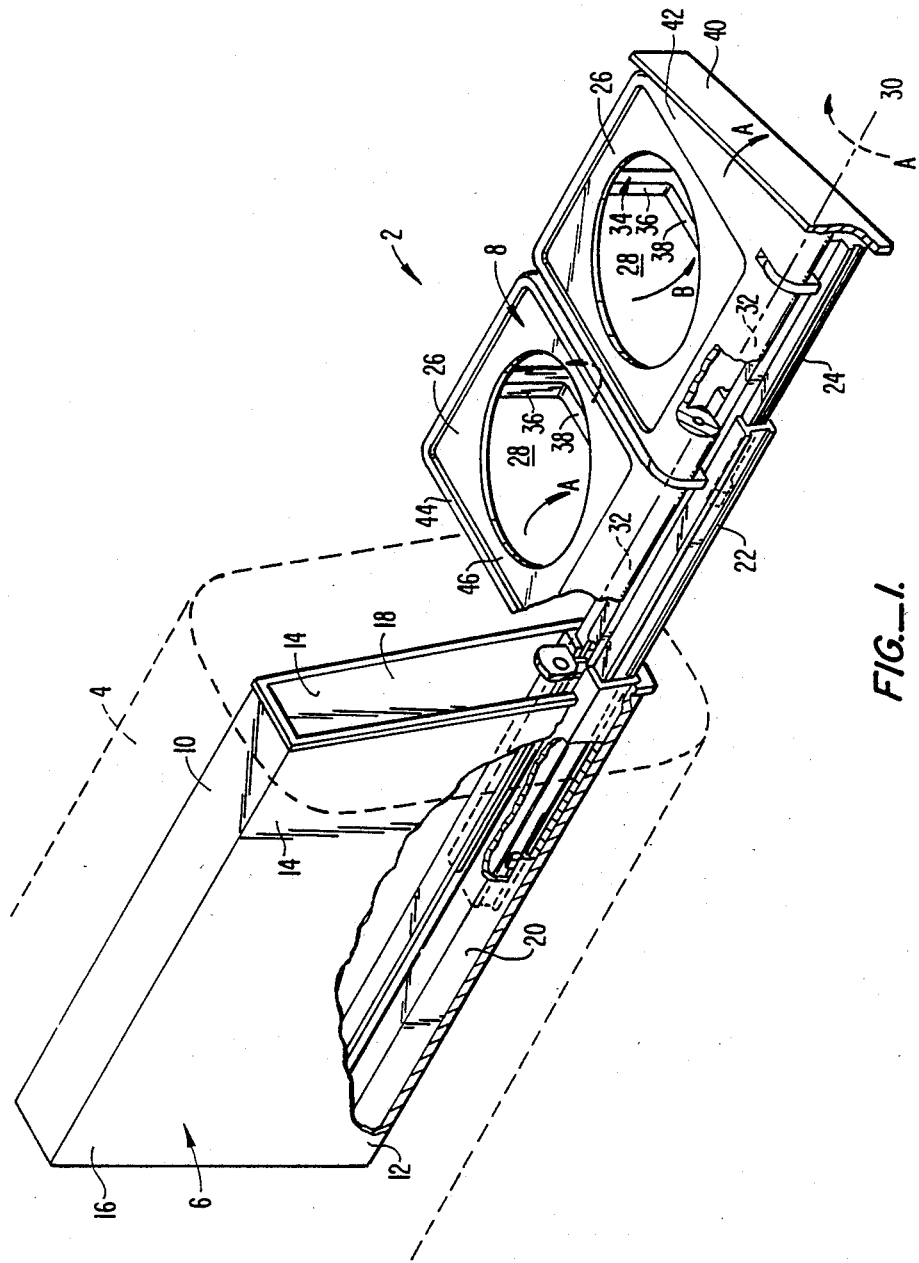
FIG._1.

CONTAINER HOLDER

BACKGROUND OF THE INVENTION

Both drivers and passengers often drink beverages while traveling in a motor vehicle. One constant problem is where to put the cup, mug, can or other beverage container. Some automobiles have horizontal surfaces which can be used to support a beverage container; however, while the vehicle is in motion, the container is often likely to spill. Numerous devices have been developed to properly support a beverage container, especially while the vehicle is in motion. Three such devices developed by the assignees of the present application are described in U.S. Pat. No. 4,738,423 issued Apr. 19, 1988 and U.S. patent application Ser. Nos. 138,998 filed Dec. 29, 1987 and 175,555 filed Mar. 31, 1988, which are hereby incorporated by reference. These devices each include a generally horizontal frame having at least one central open area for receiving the container.

Another type of holding device is in the form of a cylindrical basket with a generally U-shaped hook at the top which engages the opening. Still another type of holder device may be supported on the floor of the vehicle typically on the drive shaft hump. Window opening and floor-supported container holders have an obvious disadvantage of being in the way when not needed. U.S. Pat. No. 4,733,908 issued Mar. 29, 1988 discloses a container holder having a foldable holder member. Because the holder member of U.S. Pat. No. 4,733,908 includes numerous moving parts and gear mechanisms, it may be folded and stored vertically.

SUMMARY OF THE INVENTION

The present invention is directed to a beverage container holder, particularly suited for use with motor vehicles, which retracts out of the way when not needed. The container holder is stored vertically to conserve space, but is positioned horizontally while in use.

The container holder includes a housing mounted to a support and a frame movably mounted within the housing. The housing is typically mounted to a support within an opening in the instrument panel or center console within an armrest of the motor vehicle. The housing and frame are preferably slidably mounted to one another so that the frame is out of sight when in its vertical, storage position within the housing. When the frame is pulled to its extended, horizontal, operational position, the frame exposes a container receiving opening. The opening defined by the frame is typically circular to accommodate conventional soft drink cans or paper or plastic cups. It could also be configured to accept protruding handles as are found on coffee mugs.

The frame is slidable through a vertical slot in the housing between its extended and retracted positions. The frame slides longitudinally on a guide positioned within the slot, along a bottom side of the housing. The frame is pivotable from its extended position to its horizontal, operational position. The frame pivots about an axis disposed along one edge of the frame spaced from the container receiving opening.

In the preferred embodiment, the container holder includes a bottom support pivotably mounted to and suspended from the frame. A part of the bottom support is positioned beneath the open area when the frame is in its horizontal, operational position, for vertically supporting the container placed in the open area.

Other features and advantages of the invention will appear from the following description in which the preferred embodiment has been set forth in detail in conjunction with the accompanying drawings.

BRIEF DESCRIPTION OF THE DRAWING

FIG. 1 is a perspective view of a beverage container holder shown in its horizontal, operational position and mounted within an automobile armrest.

DETAILED DESCRIPTION OF THE PREFERRED EMBODIMENT

Referring now to the drawing, FIG. 1 illustrates a container holder 2 mounted within a support 4 (shown in dashed lines). Container holder 2 includes a housing 6 mounted within support 4 and a frame 8 slidable within housing 6.

Housing 6 has a generally rectangular box-like configuration having six sides. Housing 6 has a narrow top side 10 and a narrow bottom side 12. Top side 10 and bottom side 12 are disposed parallel to and spaced apart from each other. First and second parallel upright sides 14 are spaced apart from each other and disposed perpendicularly between opposite edges of top side 10 and bottom side 12. A back side 16 defines a vertical plane perpendicular to top and bottom sides 10, 12 and upright sides 14. Back side 16 closes one side of box-like housing 6 by connecting top and bottom sides 10, 12 and upright sides 14. A slot 18 is formed in housing 6 at the side opposite back side 16. The side forming slot 18 is angled with respect to the vertical plane defined by back side 16.

Guide 20 is disposed within housing 6 adjacent bottom side 12. Guide 20 includes an outer member 22 and an inner member 24 telescoping within the outer member.

Frame 8 is pivotably mounted on inner member 24 of guide 20. Frame 8 includes integral members 26 having an opening 28 formed in each integral member. Frame 8 is pivotable about a pivot axis 30 in a direction as shown by arrow A from a vertical, storage position (not shown) to a horizontal, operational position (as shown in FIG. 1). Pivot axis 30 is spaced from opening 28 and positioned at one edge 32 of integral member 26.

Frame 8 includes two integral members 26 juxtaposed such that each includes an edge 32 pivotable about pivot axis 30. A lip 40 is formed at the front end 42 of one integral member 26 for grasping of frame 8 by the user for movement from the vertical, storage position to the horizontal, operational position. A retaining edge 44 is disposed on rear end 46 of integral member 26 for retaining frame 8 in its extended position by cooperating with the side of housing 6 having slot 18 formed therein.

It should be noted that while the embodiment shown in FIG. 1 includes two integral members, the container holder of the present invention could be constructed having one or more integral members 26. If frame 8 is constructed with a plurality of integral members 26, guide 20 may include a detent (not shown) for retaining frame 8 in a position such that only one integral member 26 can be extended if so desired.

A bottom support 34 is pivotably mounted to each integral member 26. Each bottom support 34 includes a pair of depending legs 36 (only one is shown in the FIGURE). A horizontal leg 38 connects each pair of vertically depending legs 36. Bottom support 34 is mounted to each integral member 36 beneath opening 28 for vertically supporting a container held in the opening. Bottom support 34 pivots relative to integral member 26 from a storage position generally parallel to frame 8 to an operational position generally perpendicular to frame 8. Bottom support 34 is spring biased to its operational position. When frame 8 is in the retracted position, bottom support 34 is held adjacent frame 8 by upright sides 14. In the operational position, bottom support 34 is biased to its vertical position (as seen in the FIGURE).

The operation of container holder 2 will now be described. In storage, container holder 2 is retracted within housing 6 in its vertical position (not shown). Inner member 24 is telescopingly received within outer member 22, when frame 8 is retracted into housing 6. Bottom support 34 is retained in its storage position, generally parallel to frame 8. By pulling lip 40, outer member 22 and inner member 24 are withdrawn from housing 6 through slot 18. As frame 8 is extended, bottom support 34 is biased in the direction of arrow B toward its operational position. When frame 8 is still in its vertical position, fully extended from housing 6, the user manually rotates frame 8 about pivot axis 30 to its horizontal, operational position as seen in FIG. 1.

In its operational position, retaining edge 44 prevents retraction of frame 8 into housing 6. The user may then insert a container, such as a can or cup, into opening 28, for supporting the container in a stable, upright position.

Modifications and variations can be made to the disclosed embodiment without departing from the subject of the invention as defined by the following claims.

What is claimed:

1. A container holder for use with a support, the container holder comprising:
   a housing including an elongated vertical slot defining a generally vertical plane, and means for mounting said housing to the support;
   a guide slidable within said slot along an axis and extendable outwardly of said elongated vertical slot in an operational position; and
   a frame including an integral member having an opening for holding a container formed within said integral member, said frame being pivotally disposed on said guide for movement between a vertical, storage position, generally parallel to the vertical plane of said slot, and a horizontal, operation position, generally perpendicular to the vertical plane of said slot, said integral member receiving a container within said opening when said frame is in the operational position.

2. The container holder as defined in claim 1 wherein said frame pivots about a pivot axis disposed along an edge of said integral member.

3. The container holder as defined in claim 1 wherein said frame pivots about a pivot axis, said pivot axis comprising an imaginery line extending infinitely in the direction of said pivot axis, wherein said imaginery line is spaced from said opening.

4. The container holder as defined in claim 1 wherein said frame pivots about a pivot axis parallel to the axis along which said guide is slidable.

5. The container holder as defined in claim 1 wherein the axis along which said guide is slidable is perpendicular to the vertical plane of said slot.

6. The container holder as defined in claim 1 further comprising means disposed on said frame for maintaining said integral member in said operational position.

7. The container holder as defined in claim 1 wherein said frame includes a plurality of openings for holding a plurality of containers.

8. The container holder as defined in claim 1 wherein said guide includes an outer member and an inner member telescoping within said outer member.

9. The container holder as defined in claim 1 further comprising a back side defining a generally vertical plane, a front side spaced from said back side and forming an angle with respect to the vertical plane defined by the back side, said slot formed in said front side.

10. The container holder as defined in claim 1 wherein said integral member is mounted to said guide.

11. The container holder as defined in claim 1 further comprising a bottom support mounted to said integral member for vertically supporting the container held in said opening.

12. The container holder as defined in claim 11 wherein said frame support is pivotably mounted to said frame.

13. The container holder as defined in claim 11 wherein said bottom support is pivotally disposed on said integral member such that the bottom support is parallel to said frame when said frame is in its storage position and perpendicular to said frame when said frame is in its operational position.

14. A container holder for use with a support, the container holder comprising:
   a housing including means for mounting said housing to the support, and an elongated slot formed at one end of said housing and defining a generally vertical plane;
   a guide slidable within said slot along an axis perpendicular to the vertical plane of said slot, said guide including an outer member and an inner member telescoping with said outer member; and
   a frame including an integral member having an opening for holding a container formed within said integral member, said frame being pivotably disposed on said guide about a pivot axis for movement between a vertical, storage position, generally parallel to the vertical plane of said slot, and a horizontal, operational position, generally perpendicular to the vertical plane of said slot, said pivot axis being disposed along an edge of said integral member, and said integral member receiving a container within said opening when said frame is in the operational position.

15. The container holder as defined in claim 14 wherein said frame is movable from an innermost location to an outermost location, said frame being in its outermost location when in the operational position.

16. The container holder as defined in claim 14 further comprising a back side defining a generally vertical plane, a front side spaced from said back side and forming an angle with respect to the vertical plane defined by the back side, said slot formed in said front side.

17. The container holder as defined in claim 14 wherein said integral member is mounted directly to said guide.

18. A container holder for use with a support, the container holder comprising a rectangular box-like housing having means for mounting said housing to the support, and a frame for holding a container, said housing including:

a top side and a bottom side disposed parallel to and spaced apart from each other;

first and second parallel upright sides spaced apart and disposed perpendicularly between the top and bottom sides;

a back side defining a vertical plane perpendicular to the top and bottom sides and the upright sides, said back side connecting the top and bottom sides and the first and second upright sides; and a front side spaced from the back side, disposed between the top and bottom sides and the first and second upright sides, the front side forming an angle with respect to the vertical plane defined by the back side, the front side having a slot formed therein for receiving said frame; and a guide slidable within the slot, into the housing, along the bottom side, said guide including an outer member and an inner member telescoping within said outer member;

said frame comprising:

a frame including a plurality of integral members positioned adjacent to each other, each integral member having an opening for holding a container formed within the integral member, said frame being pivotably disposed on said inner member of said guide about a pivot axis for movement between a vertical, storage position, generally parallel to the first and second upright sides and a horizontal, operational position, generally perpendicular to the storage position, said integral member receiving a container within said opening when said frame is in the operational position;

said pivot axis disposed along an edge of each of said integral members and spaced from the openings; and a bottom support mounted to each of the integral members beneath the opening for vertically supporting a container held in the opening, said bottom support being pivotably disposed on said integral member such that the bottom support is parallel to said frame when said frame is in its storage position and perpendicular to said frame when said frame is in its operational position.

* * * * *